Patented Mar. 4, 1952

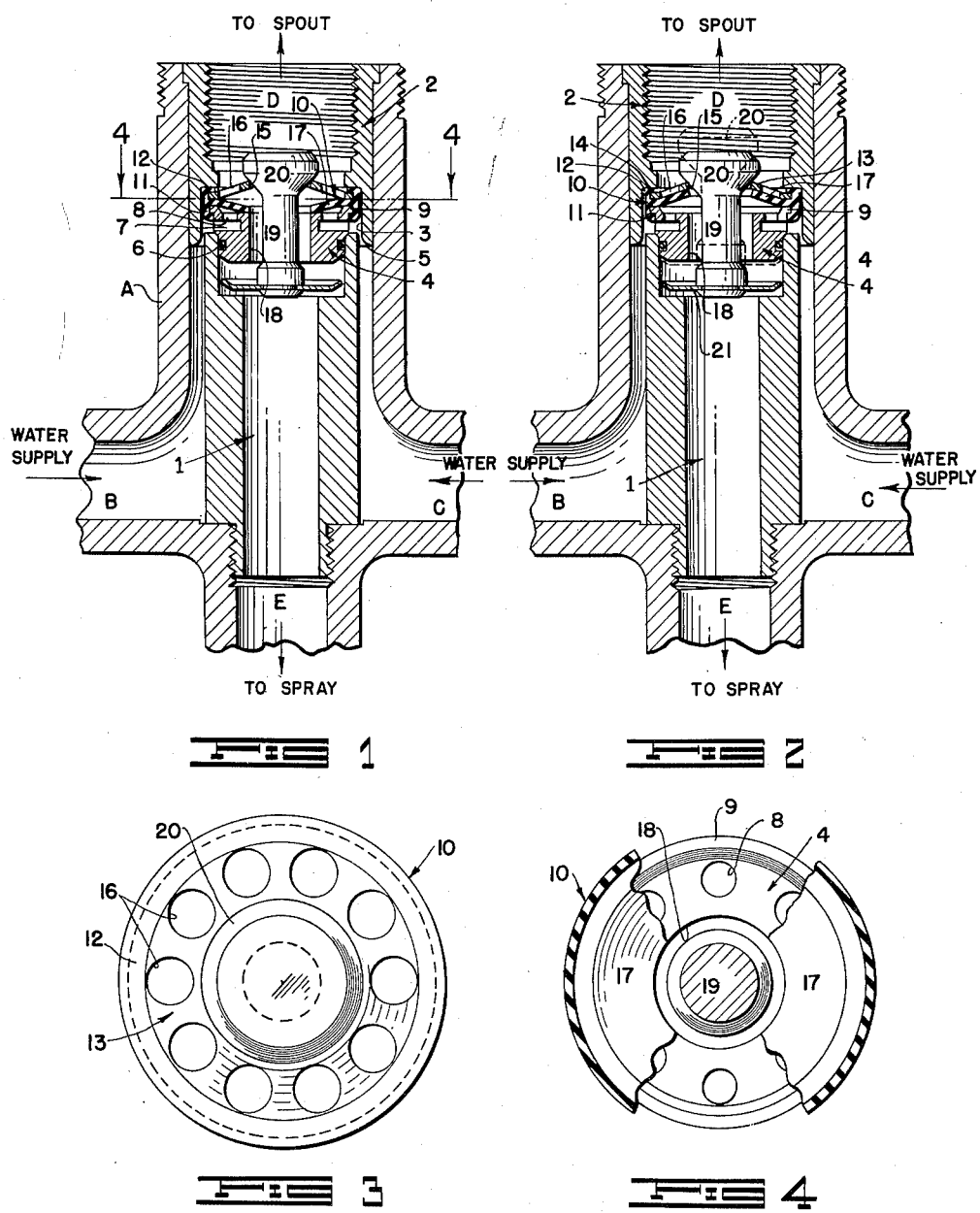

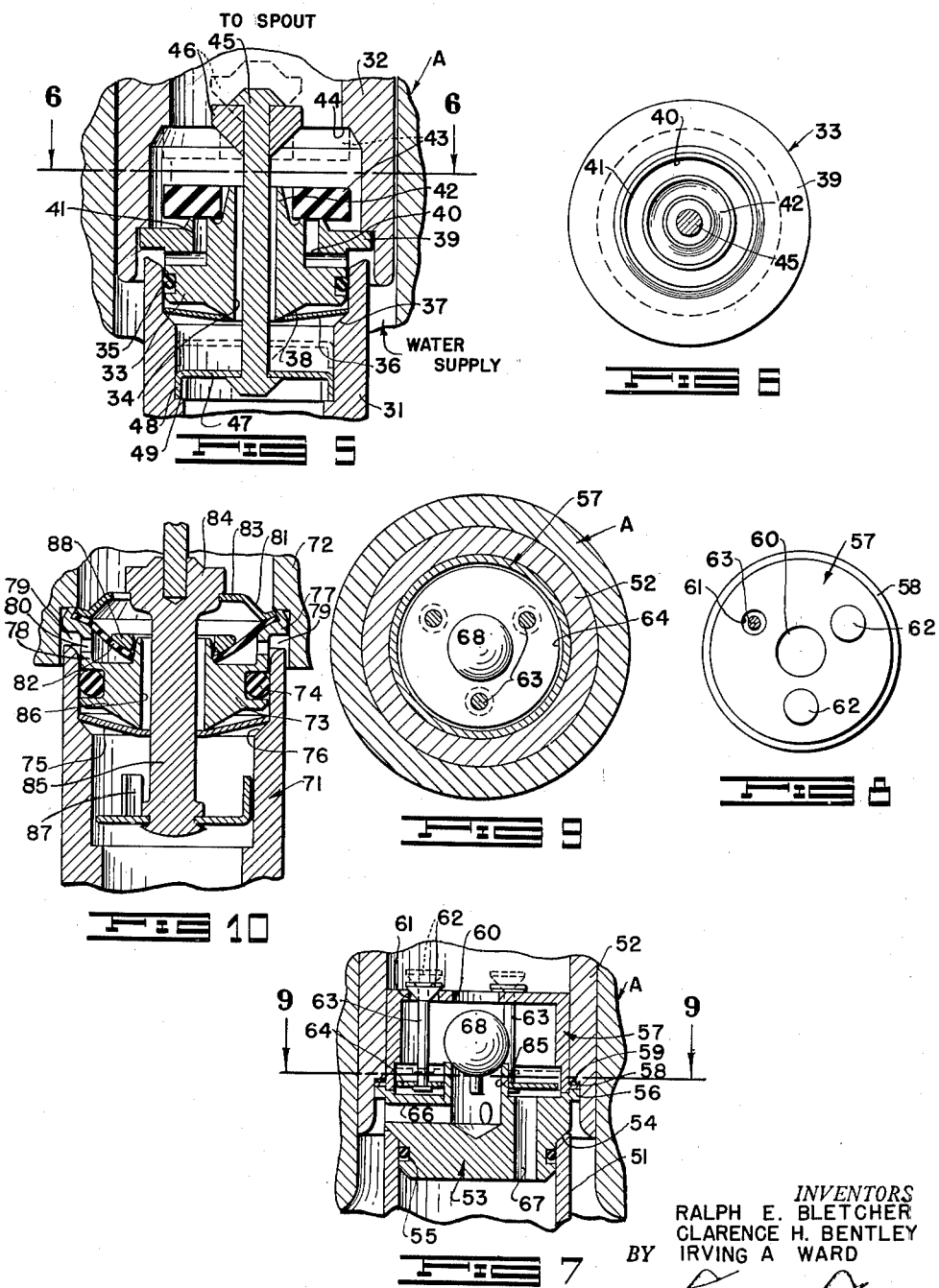

2,587,960

UNITED STATES PATENT OFFICE 2,587,960

TRANSFER VALVE

Ralph E. Bletcher, Clarence H. Bentley, and Irving A. Ward, Los Angeles, Calif., assignors to Modern Faucet Mfg. Co., Los Angeles, Calif., a corporation of California Application October 6, 1947, Serial No. 778,054

14 Claims. (Cl. 277—61)

Our invention relates to transfer valves; that is, to valves interposed between a hot-cold water supply, a faucet spout and a spray head whereby water may be discharged from the faucet or from the spray head.

Included in the objects of our invention are:

First, to provide a transfer valve which is antisiphonic; that is, backflow is prevented should low pressure develop in the supply line which would otherwise tend to draw water from the spray head should these members be immersed in liquid.

Second, to provide a transfer valve which may be so arranged that when functioning as a seal to prevent backflow provides open communication between the faucet spout and spray head to relieve pressure on the spray head and the hose line between the transfer valve and spray head.

Third, to provide a transfer valve which, although performing the multiple functions of controlling flow to a faucet spout or spray head as well as preventing backflow, is particularly compact in design so as to fit in the limited space conventionally available in the region at which the faucet spout and spray hose is connected to the source of supply.

Fourth, to provide a transfer valve having an anti-siphonic means which does not in any way interfere with the normal function of the valve.

Fifth, to provide a transfer valve which, proportional to its functions, is particularly simple and economical of manufacture.

Sixth, to provide a transfer valve which is arranged as a unitary structure so that all parts may be assembled before installation in order that it may be readily inserted or removed as a unit.

With the foregoing and other objects in view, reference is directed to the accompanying drawings in which:

Figure 1 is a fragmentary sectional view of a plumbing fixture incorporating one form of our transfer valve, the transfer valve parts being shown in their normal position assumed when the water supply is shut off, this also being the position assumed when the valve is functioning to prevent back siphoning.

Figure 2 is a similar sectional view showing the parts of the transfer valve when the spray head is in operation, and indicating by dotted lines the position of the parts when the spout is in operation and the spray head is closed.

Figure 3 is a top view of the transfer valve.

Figure 4 is a sectional view thereof through 4—4 of Figure 1.

Figure 5 is a sectional view similar to Figures 1 and 2, showing a modified form of our transfer valve, the valve being shown by solid lines in its normal position when the supply is closed, and indicating by broken lines the positions assumed when the valve is in operation.

Figure 6 is a transverse sectional view of the transfer valve taken through 6—6 of Figure 5.

Figure 7 is a similar fragmentary sectional view of a further modified form of our transfer valve showing the parts in their normal position when the supply is closed and indicating by broken lines the positions of the transfer valve when in operation.

Figure 8 is an end elevational view of the valve shown in Figure 7.

Figure 9 is a transverse sectional view thereof through 9—9 of Figure 7.

Figure 10 is a transverse sectional view of a further modified form of our transfer valve, the valve being shown in antisyphonic position.

Reference is first directed to the construction shown in Figures 1 to 4 inclusive. In Figure 1, the transfer valve is shown mounted in a housing A having laterally directed supply passages B and C communicating with hot and cold water valves, not shown, and an upwardly directed faucet outlet passage D. The housing is also provided with a spray supply outlet E in axial alignment with the faucet spout outlet D.

Mounted in the spray outlet E and projecting upwardly into the faucet outlet passage D is a spray outlet stem 1. Fitted in the faucet spout outlet passage D is a sleeve 2. The lower end of the sleeve 2 is counterbored as indicated by 3 and telescopes slightly over the stem 1. Space is provided between the stem 1 and sleeve 2 for the flow of liquid into the bores of the sleeve and stem.

Our transfer valve is mounted in the confronting portions of the stem 1 and sleeve 2 and includes a valve body 4 adapted to fit into the upper end of the stem 1. The valve body is provided with a shoulder 5 which rests on a mating shoulder formed at the extremity of the stem 1. Within the stem 1 the valve body is provided with an annular channel which receives a seal ring 6. Above the stem 1, the valve body is provided with an annular channel 7 which is intersected by axially directed ports 8. The upper margin of the valve body 4 is provided with a rim 9.

A sealing unit 10 formed of rubber, synthetic rubber or other yieldable material overlies the valve body 4. The sealing unit includes a lower lip 11 which is molded to fit over the rim 9. The sealing unit also includes an upper lip 12 which grips the marginal portion of a plate 13. The upper extremity of the lip 12 forms a sealing gasket which bears against a shoulder 14 at the upper extremity of the counterbore 3. Thus, the transfer valve may be clamped between the sleeve 2 and stem 1.

The plate 13 is conical in form and provided with a central opening 15 and a ring of perforations 16. The sealing unit 10 includes an annular sealing lip 17 which extends radially inwardly under the plate 13 and over the ports 8 in the valve body 4. As will be brought out hereinafter, the sealing lip 17 moves between a position sealing the perforations 16 and the ports 8.

The valve body is provided with a central bore 18 in registry with the central opening in the sealing lip 17 and the plate 13. A valve stem 19 is loosely mounted in the bore 18 and terminates in a head 20 located above the plate 13. The lower extremity of the stem 19 is attached to an actuator washer 21 which underlies the valve body 4.

Operation of our transfer valve is as follows:

When the water supply is closed, the parts of the valve are in the position shown in Figure 1; that is, the head 20 of the valve stem is in sealing engagement with the margins of the central opening 15 and the sealing lip 17 overlies the ports 8. When the water supply is turned on, the water flows between the stem 1 and the sleeve 2 into the channel 7 upwardly through the ports 8. If the line connected with the spray outlet stem 1 is closed, the water pressure lifts the valve head clear of the plate 13 and the water flows out the sleeve 2 and the spout, not shown, connected therewith. If the spray outlet head, not shown, connected with the spray outlet stem 1 is opened, back pressure under the actuator washer 21 is relieved causing the stem to assume the solid line position shown in Figure 2 and permitting flow through the central bore 18 and around the periphery of the actuator washer. It will be observed that the passageway between the washer 21 and the internal walls of the stem 1 is restricted so that an adequate pressure differential is maintained across the actuator washer to hold the valve head seated on the plate 13. The water pressure under such conditions holds the sealing lip 17 against the perforations 16.

In the event that there exists a negative pressure or lower pressure in the supply passages B and C, the sealing lip 17 is drawn downwardly over the ports 8 and seals these ports so that backflow cannot take place whether the flow originates from the spray outlet stem 1 or the sleeve 2 and the spout associated therewith. Such downward movement of lip 17 opens ports 16 to admit air from the spout and relieve any vacuum within the transfer valve and passage E. It is preferred that the actuator washer 21 when in its upper position in engagement with the valve body fails to form a seal so that under low pressure conditions in the supply passages the higher pressure in the spray outlet stem and associated line will be relieved through the faucet outlet passage.

Reference is now directed to the construction shown in Figures 5 and 6. The transfer valve here illustrated is adapted to fit in the same region as the first described valve. As in the first described structure, there is provided a spray outlet stem 31 and a sleeve 32, the confronting ends of which telescope slightly and are spaced to define a water passage. The upper end of the spray outlet stem is adapted to receive a valve body 33 having a central bore 34 and provided with an external channel in which is fitted a seal ring 35 for sealing engagement with the walls of the stem 31.

Disposed under the valve body 33 is a disc spring 36, the outer periphery of which is adapted to bear against a beveled shoulder 37 formed in the spray outlet stem and the inner periphery of which is adapted to bear against a beveled shoulder formed on the underside of the valve body 33.

The extended portion of the valve body 33 is provided with a flange 39 which is adapted to bear against a shoulder formed in the sleeve 32 so that the valve body may be clamped between the sleeve and stem. It will be observed that the valve body does not itself bear against the stem 31, but instead bears against the inner periphery of the disc spring 36, the outer periphery of which engages the stem 31.

The valve body is provided with passages 40 comprising an annular recess and intersecting radial ports communicating between its side walls under the flange 39 and its upper extremity. The annular recess portion of the passages 40 intersects a ring seat 41 provided in the upper surface of the body 33; the inner periphery of the ring seat is bordered by an upstanding guide lip 42. A valve ring 43 formed of rubber, synthetic rubber, or the like is adapted to float in the sleeve 32 and when in its lower position rest on and seal the passage 40. The valve ring 43 is adapted, when moved to its upper position, to engage a shoulder or seat 44 formed in the sleeve 32.

The central bore 34 of the valve body loosely receives a valve stem 45, the upper end of which is provided with a head 46 adapted to be engaged by the inner margin of the valve ring 43. The lower extremity of the stem 45 is provided with an actuator washer 47 having depending bumpers 48. The actuator washer forms with the walls of the spray outlet stem 31 a restricted passage. Downward movement of the stem 45 is limited by a shoulder 49 provided in the spray outlet stem 31, which shoulder is engaged by the bumpers 48 of the actuator washer.

The transfer valve, as shown in Figures 5 and 6, functions as follows:

When the supply lines are closed, the valve parts assume the position shown in Figure 5; that is, the valve ring 43 and the valve stem 45 are in their lower positions. This is also the position assumed should there be a vacuum or lowered pressure in the supply lines. In such an event, the valve ring 43 functions to seal the passages 40 and prevent backflow from either the spout outlet or the line connected with the spray outlet stem 31. It should be observed that the disc spring 36 provides a secondary seal between the valve body 33 and the spray outlet stem, such seal supplementing the seal ring 35. It will also be observed that in conditions of negative pressure in the supply line there is open and direct communication through passage 34 between the spray outlet stem 31 and the faucet outlet so that any pressure therein is equalized. This opening cannot be obstructed due to the fact that the guide lip 42 projects through the opening in the washer 43.

When the water supply is turned on and the spray outlet is open, the transfer valve assumes the position shown by solid lines in Figure 5. Under such conditions the water flows through the passages 40, lifts the valve ring 43, flows over the guide lip 42, then through the bore 34 and around the actuator washer 47. The restricted passageway provided by the actuator washer creates a pressure differential across the washer which holds the valve stem in its lower position. The water pressure existing above the valve body forces the ring valve against the seat 44 and against the head 46 of the valve stem to prevent flow from the faucet communicating with the sleeve 32. When the valve, not shown, in the spray head associated with the spray outlet stem 31 is closed so that a back pressure exists in the stem, the valve head 46 moves to its upper or dotted line position clear of the valve ring 43 so that water may flow from the spout.

Reference is now directed to Figures 7, 8 and 9. In this construction also, a spray outlet stem 51 projects into a sleeve 52 and defines therewith a water passageway. The upper end of the stem 51 receives a valve body 53 having a shoulder 54 which seats against the end of the stem. The body 53 is provided with an annular channel which receives a seal ring 55. The upper extremity of the body 53 forms a flange 56 which fits within a counterbore formed in the lower portion of the sleeve 52. A cap 57 fits within the sleeve 52 and is provided at its lower end with a flange 58 which mates with the flange 56. Above the flange 58 there is provided a washer 59. The valve body 53 and the cap 57 are adapted to be clamped between the sleeve 52 and the stem 51 by means of the flanges and their washer 59 and the shoulder 54.

The cap 57 is provided with a central port 60. Surrounding the port are several valve ports 61 which receive poppet valves 62. The valves 62 are provided with depending stems 63 which project downwardly into a chamber defined by the cap 57 and the body 53. The lower extremities of the stems 63 are attached to an actuator ring 64.

The body 53 is provided with a tubular boss 65 directed upwardly through the actuator ring 64. The opening in the tubular boss 65 extends below the normal upper level of the body 53 to form a socket which is intersected by lateral ports 66 communicating with the sides of the body 53 above the stem 51 and below the flange 56. Also provided in the body 53 are axially directed passages or ports 67 communicating between the upper end of the body 53 (that is the chamber formed by the body 53 and cap 57) and the interior of the stem 51.

A ball valve 68 is adapted to seat and close the tubular boss 65 and also when raised to engage and close the central port 60 in the cap 57.

Operation of the transfer valve, as shown in Figures 7, 8 and 9, is as follows:

When the water supply is shut off, the parts of the valve are in the position shown by solid lines. This is also the position assumed should a negative pressure exist in the supply lines. Under such conditions the ball valve 68 seats against the tubular boss 65 closing off communication between the water supply and both the sleeve 52 and spray outlet stem 51. When the faucet is in operation, the ball valve 68 raises as do also the poppet valves 62. When flow through the spray outlet stem is permitted, the water flows upwardly out of the tubular boss 65 above the actuator ring 64 and through the axial ports 67. The internal and external passageways around the actuator ring 64 are sufficiently constricted to maintain a pressure differential sufficient to hold the valves 62 seated on the valve ports 61.

Reference is now directed to Figure 10. This construction involves, as in the previously described structures, a spray outlet stem 71 and a sleeve 72, the confronting ends of which telescope slightly and are spaced to define a water passage. The upper end of the spray outlet stem 41 is counterbored to receive a valve body 73.

The valve body is provided with an external channel which receives an O ring 74 for sealing engagement with the outlet stem 71. A disk spring 75 is placed under the body 73. The outer periphery of the disk spring bears against a shoulder 76 formed within the bore of the stem 71 whereas the inner periphery of the disk spring bears against a beveled shoulder provided at the lower end of the body 73.

The upper end of the body 73 is provided with an upwardly directed outer rim 77 and an inner rim 78, which define therebetween an annular channel 79. Ports 80 in the base of the rim 77 communicate between the water inlet, defined by the telescoping extremities of the stem 71 and sleeve 72, and the annular channel 79.

The upper portion of the outer rim 77 forms an offset shoulder and its extremity is adapted to be constricted to clamp the margin of a metal guide ring 81 and a flexible seal ring 82. The flexible seal ring overlies the annular channel 79 and is adapted to seal against the inner rim 78, thereby to prevent back flow through the ports 80.

The guide ring 81 is provided with internal lugs 83 which support the head 84 of a valve stem 85. The body 73 is provided with a central bore which accommodates loosely the valve stem. The lower extremity of the valve stem below the body 73 is provided with a stop member 87 which limits upward movement of the valve stem.

The under side of the valve head forms a seat which is adapted to be engaged by a seal collar 88 interposed between the flexible seal ring 82 and the valve head.

Operation of the transfer valve shown in Figure 10 is as follows:

During conditions in which a negative pressure may exist in the inlet opening the flexible seal ring is depressed as shown in Figure 10, closing the ports 80 against back flow. When flow occurs through the spray outlet; that is, downwardly through the central bore 86, the seal ring and seal collar are urged upwardly to seal against flow through the guide ring 81 around the valve head. When flow occurs from the spout communicating with the sleeve 72 the valve head is raised so that the seal collar cannot function.

It will be noted that in each of the constructions shown the water inlet is an annular space between the spray stem and the spout sleeve. This space may be relatively large in diameter so that the width of the opening thus defined may be quite small; thus the opening may function as a strainer or restricted passage to prevent entrance of deleterious matter into the spray head.

Having fully described our invention, it is to be understood that we do not wish to be limited to the details herein set forth, but our invention is of the full scope of the appended claims.

We claim:

1. A transfer valve structure, comprising: means defining a valve passage, one end communicating with a first outlet, the other with a second outlet; valve means mounted in said valve passage to control flow to said first outlet; means responsive to flow through said second outlet for closing said valve means; inlet ports communicating with said valve passage between said flow responsive means and said valve means; a relief passage communicating between said first outlet and said valve passage independently of said valve means; and valve means to close said inlet ports and open said relief passage when pressure in said inlet ports is less than pressure in said valve passage.

2. A transfer valve structure adapted for installation between a pair of confronting tubular members, their confronting ends defining an inlet and their remote ends opposed outlets, the combination of: a body structure mounted in fixed sealing engagement with said tubular members and defining a valve passage communicating with the outlets thereof, and an inlet port communicating between said valve passage and the inlet defined by said tubular members; a valve for controlling flow between said valve passage and one of said outlets; an actuator connected with said valve and disposed between said valve passage and the other of said outlets, said actuator being responsive to flow in said other outlet, to close said valve; and a back pressure valve between said valve passage and said inlet ports adapted to seal said inlet ports from both of said outlets when the pressure in said inlet ports is less than the pressure in said valve passage.

3. A transfer valve structure adapted for installation between a pair of confronting tubular members, their confronting ends defining an inlet and their remote ends opposed outlets, the combination of: a valve body adapted to be disposed in the confronting ends of one of said tubular members and defining a through passage for communication with said outlets, and an inlet passage communicating between said inlet and one end of said valve body; sealing means between said valve body and said tubular members at opposite sides of said inlet passage; valve means disposed between said one end of the valve body and the adjacent tubular member to control flow through said adjacent tubular member; an actuator responsive to flow in said through passage to close said valve means; and a back pressure valve between said valve means and said inlet port to close said inlet port should the pressure at said inlet be less than in said tubular members.

4. A transfer valve structure adapted for installation between a pair of confronting tubular members, their confronting ends defining an inlet and their remote ends opposed outlets, the combination of: a valve body defining a through passage for communication with said outlets, and an inlet passage communicating between said inlet and one end of said valve body; sealing means between said valve body and said tubular members at opposite sides of said inlet passage; means overlying and spaced from the inlet passage end of said valve body and defining a flow valve port and a relief valve port communicating between said inlet passage and the corresponding tubular member; a control valve for said flow valve port; a movable sealing element mounted between said pressure relief valve port and said inlet passage to close said pressure relief valve port and open said inlet passage when the pressure at said inlet passage exceeds the pressure in said corresponding tubular member and to open said pressure relief valve port and close said inlet passage when the pressure at said inlet passage is below the pressure in said tubular member; and an actuator responsive to flow in said through passage to close said control valve.

5. A transfer valve unit, comprising: a valve body having a bore therethrough and defining an inlet port entering from the sides of said valve body and communicating with one end; means overlying and spaced from said inlet port and defining a flow valve port and a pressure relief valve port; a control valve for said flow valve port; and a sealing element interposed between said pressure relief valve port and said inlet port and movable to open either and close the other of said ports; and an actuator responsive to flow in said bore to close said control valve.

6. A transfer valve structure comprising: a body member; a pair of confronting tubular members adapted to sealingly engage said body member and defining therebetween an inlet and defining at their remote ends outlets, one of said tubular members forming a valve seat spaced from an end of said body member; said body member defining a through passage communicating between the outlet ends of said tubular members and an inlet port communicating between said inlet and the end of said body member facing said valve seat; a floating ring valve movable between said inlet port and said valve seat and defining a central valve opening; a valve adapted to seal said opening, said valve including a stem extending through said through passage; and an actuator element for said valve carried by said valve stem.

7. A transfer valve structure, comprising: a valve body defining an inlet passage entering from a side of the valve body and terminating in an inlet port at one end of said valve body, and a through passage communicating between the ends of said valve body; a cap overlying said one end of the valve body and defining therewith a valve chamber, said cap having a pressure relief port opposite said inlet port and a valve port; a valve element movable between said inlet port and pressure relief port to close said ports alternatively; a valve member for closing said valve port; and an actuator connected with said valve member and responsive to flow in said through passage for closing said valve member.

8. A transfer valve structure, comprising: a valve body defining an inlet passage entering from a side of the valve body and terminating in an inlet port at one end of said valve body, and a through passage communicating between the ends of said valve body; a cap overlying said one end of the valve body and defining therewith a valve chamber, said cap having a pressure relief port opposite said inlet port and a valve port; a valve element movable between said inlet port and pressure relief port to close said ports alternatively; a valve member for closing said valve port; and an actuator mounted in said valve chamber and connected with said valve member, said actuator being responsive to flow in said valve chamber from said inlet port into said through passage to close said valve member.

9. A transfer valve structure, comprising: a valve body defining an inlet passage entering from a side of the valve body and terminating in an inlet port at one end of said valve body, and a through passage communicating between the ends of said valve body; a cap overlying said one end of the valve body and defining therewith a valve chamber, said cap having a pressure relief port opposite said inlet port and a valve port; a valve element movable between said inlet port and pressure relief port to close said ports alternatively; a valve member for closing said valve port; a stem for said valve member extending through said through passage; and an actuator at the extremity of said stem responsive to flow in said through passage to close said valve member.

10. A transfer valve structure adapted for installation between a pair of confronting tubular members, their confronting ends defining an inlet and their remote ends opposed outlets, the combination of: a valve body defining a through passage communicating between said inlet and one end of said valve body, sealing means between said valve body and said tubular members at opposite sides of said inlet passage; a plate member spaced from said inlet end of said valve body having a valve port and at least one relief port therein, a control valve to control flow through said valve port, a movable resilient sealing member mounted between said pressure relief valve ports and said inlet passage to close said pressure relief valve ports and open said inlet passage when the pressure at said inlet passage exceeds the pressure in said corresponding tubular member and to open said pressure relief valve port and close said inlet passage when the pressure at said inlet passage is below the pressure in said tubular member, an actuator responsive to a greater pressure above said actuator to close said control valve and responsive to a greater pressure below said actuator to open said control valve.

11. In a device for controlling the direction of flow of water in a combination fixture including a casing having a water inlet and two water outlets and an anti-back-flow transfer valve mounted between the water outlets and within the casing, said transfer valve comprising a transfer valve outlet member positioned within the casing and connecting with one of the water outlets and defining an annular transfer valve inlet with the casing, a floating valve means within the transfer valve and adapted to stop communication between the annular transfer valve water inlet and the last mentioned water outlet when pressure within the transfer valve exceeds the pressure within the casing but external to the transfer valve, a pressure control valve element including a valve head element positioned with respect to the second water outlet and adapted to move responsive to pressure of the water within the first stated water outlet and the floating valve element adapted to cooperate with the said valve head to close the second water outlet when water is flowing through the first water outlet, and the said floating valve element being adapted to open the second water outlet when pressure within the transfer valve exceeds the pressure within the casing external to the transfer valve to prevent backflow from within the transfer valve to the casing under conditions of negative pressure within the casing water inlet.

12. In a device for controlling the direction of flow of water in a combination fixture including a casing having a water inlet and two water outlets and an anti-back-flow transfer valve mounted between the water outlets and within the casing, said transfer valve comprising a transfer valve body positioned within the casing and having an outlet to one of said water outlets and defining an annular transfer valve inlet with the casing, a floating valve means within the transfer valve and adapted to stop communication between the annular transfer valve water inlet and the last mentioned water outlet when pressure within the transfer valve exceeds the pressure within the casing but external to the transfer valve, a pressure control valve element including a valve head element positioned with respect to the second water outlet and adapted to move responsive to pressure of the water within the first stated water outlet and the floating valve element adapted to cooperate with the said valve head to close the second water outlet when water is flowing through the first water outlet, and the said floating valve element being adapted to open the second water outlet when pressure within the transfer valve exceeds the pressure within the casing external to the transfer valve to prevent backflow from within the transfer valve to the casing under conditions of negative pressure within the casing water inlet.

13. In a device for controlling the direction of flow of water in a combination fixture including a casing having a water inlet and two water outlets and an anti-backflow transfer valve mounted between the water outlets and within the casing, said transfer valve comprising a transfer valve outlet member positioned within the casing and connecting with one of the water outlets and defining an annular transfer valve inlet with the casing, valve means within the transfer valve and adapted to stop communication between the annular transfer valve water inlet and the last mentioned water outlet when pressure within the transfer valve exceeds the pressure within the casing but external to the transfer valve, a pressure control valve means positioned with respect to the second water outlet and adapted to move responsive to pressure of the water within the first stated water outlet and the valve element adapted to cooperate with the said pressure control valve means to close the second water outlet when water is flowing through the first water outlet, and the said valve element being adapted to open the second water outlet when pressure within the transfer valve exceeds the pressure within the casing external to the transfer valve to prevent backflow from within the transfer valve to the casing under conditions of negative pressure within the casing water inlet.

14. In a device for controlling the direction of flow of water in a combination fixture including a casing having a water inlet and two water outlets and an anti-backflow transfer valve mounted between the water outlets and within the casing, said transfer valve comprising a transfer valve body positioned within the casing and having an outlet to one of said water outlets and defining an annular transfer valve inlet with the casing, valve means within the transfer valve and adapted to stop communication between the annular transfer valve water inlet and the last mentioned water outlet when pressure within the transfer valve exceeds the pressure within the casing but external to the transfer valve, a pressure control valve means positioned with respect to the second water outlet and adapted to move responsive to pressure of the water within the first stated water outlet and the valve element adapted to cooperate with the said pressure control valve means to close the second water outlet when water is flowing through the first water outlet, and the said valve element being adapted to open the second water outlet when pressure within the transfer valve exceeds the pressure within the casing external to the transfer valve to prevent backflow from within the transfer valve to the casing under conditions of negative pressure within the casing water inlet.

RALPH E. BLETCHER.
CLARENCE H. BENTLEY.
IRVING A. WARD.

REFERENCES CITED

The following references are of record in the file of this patent:

UNITED STATES PATENTS

| Number | Name | Date |
| --- | --- | --- |
| 1,728,577 | Schossow | Sept. 17, 1929 |
| 2,314,071 | Bucknell | Mar. 16, 1943 |
| 2,388,432 | Nelson | Nov. 6, 1945 |